March 18, 1958   H. W. L. KEARNS   2,826,928
FACE PLATES OF HORIZONTAL BORING AND FACING MACHINES
Filed July 13, 1955   3 Sheets-Sheet 1
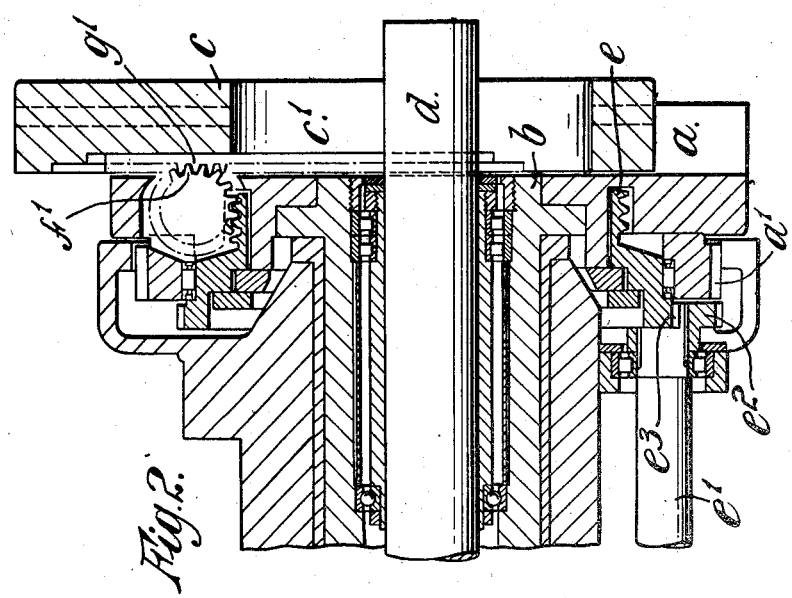
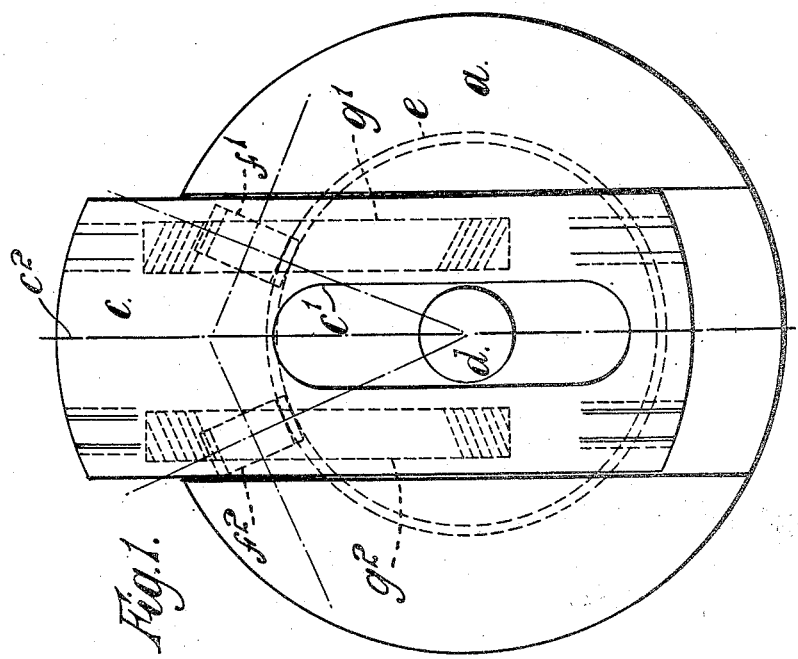
*INVENTOR:*
Henry W. L. Kearns
BY Francis C. Boyce
ATTORNEY March 18, 1958     H. W. L. KEARNS     2,826,928
FACE PLATES OF HORIZONTAL BORING AND FACING MACHINES
Filed July 13, 1955     3 Sheets-Sheet 2

INVENTOR:
HENRY W.L. KEARNS
BY: Francis C. Boyce
ATTORNEY

March 18, 1958 H. W. L. KEARNS 2,826,928
FACE PLATES OF HORIZONTAL BORING AND FACING MACHINES
Filed July 13, 1955 3 Sheets-Sheet 3

INVENTOR:
HENRY W. L. KEARNS
BY: Francis E Boyce
ATTORNEY

2,826,928
Patented Mar. 18, 1958

2,826,928

FACE PLATES OF HORIZONTAL BORING AND FACING MACHINES

Henry Ward Lionel Kearns, Altrincham, England, assignor to H. W. Kearns & Co. Limited, Broadheath, near Manchester, England Application July 13, 1955, Serial No. 521,850

1 Claim. (Cl. 74—395)

This invention relates to face plates of horizontal boring and facing machines, and its object is to provide an improved worm and wormwheel mechanism for displacing the tool-holding facing slide of the face plate of such a machine.

Unlike conventional worm and wormwheel pairs wherein the worm is considerably smaller in diameter than the wormwheel with which it meshes, the present invention utilises a worm surrounding the main spindle and therefore considerably larger in diameter than a wormwheel meshing therewith and with a rack on the facing slide.

When the facing slide of a face plate is displaced by a wormwheel directly meshing with a rack on the slide and meshing with and driven by a worm formed on a cylindrical surface co-axial with the main spindle on which the face plate is mounted, hitherto the facing slide of the face plate has been provided with only one rack which, to permit protrusion of the boring bar, is offset relatively to the axis of the face plate and of the main spindle. Since the rack is therefore offset from the longitudinal axis of the facing slide it cannot apply a balanced force to move the slide truly parallel to its own longitudinal axis and, to provide such a balanced force, obviously a pair of racks, one at each side of the longitudinal axis of the slide, would be preferable.

However, the obvious arrangement of two equally-pitched racks and wormwheels symmetrical about the longitudinal axis of the slide is not practicable because at any two angular positions of a wormwheel symmetrical on each side of a given plane containing the axis of a worm with which the wormwheel meshes, other than diametrally opposite positions, the projection of the teeth of the wormwheel on to such plane has not the same value. The longitudinal axis of the facing slide at any instant lies in such a given plane and therefore the teeth of each of identically similar wormwheels symmetrically arranged on each side of the slide axis would have different projections on to racks parallel with the slide axis. The wormwheels so disposed would therefore not mesh with equally pitched racks and unequally pitched racks would not produce a balanced thrust on the slide.

The difficulty of providing a facing slide mechanism with a pair of equally pitched racks meshing with a pair of wormwheels meshing with a worm in common, formed on a cylindrical surface around the main spindle, is overcome according to the present invention by arranging the racks asymmetrically one on each side of and parallel with the longitudinal axis of the slide such that the projection of the teeth of the wormwheels on to the common plane of the slide and spindle axes, and hence on to the racks, is of equal value in each case although, of course, opposite in direction.

Accordingly, the present invention consists in a face plate of a horizontal boring and facing machine having a facing slide displaceable transversely by a worm, formed on a cylindrical surface co-axially around the main spindle meshing with a pair of wormwheels meshing with a pair of racks on the facing slide, the racks having teeth of equal but oppositely directed inclination and being arranged parallel to but, with the wormwheels, asymmetrically on opposite sides of the longitudinal axis of the facing slide, such that the projection of the wormwheel teeth on to the respective rack is equal in each case to obtain correct meshing of the wormwheels and racks.

The present invention should be distinguished from the facing slide drive described in connection with Figs. 4 and 5 of the specification of our United Kingdom Patent No. 499,945, wherein a pair of racks on the slide are driven by identically alike helical pinions meshing therewith and with a spiral face cam co-axial with the face plate. In such arrangement, the skew teeth of the helical pinions recede, from the portion of each thereof actually in engagement with the spiral rib of the spiral face cam, away from the plane of the spiral rib. Consequently the skew pinions are not precluded from meshing both with the spiral face cam and with racks symmetrical on each side of the axis of the facing slide.

A face plate having a facing slide displaced by wormwheels meshing both with a worm co-axial with the main spindle and with two racks provided asymmetrically one on each side of the longitudinal axis of the facing slide, is shown, in some views somewhat diagrammatically, in the accompanying drawings, in which:

Fig. 1 is a front elevation of the face plate on a main spindle, and

Fig. 2 is a longitudinal section thereof with some parts in section in different planes for the purpose of illustration.

Figure 3:
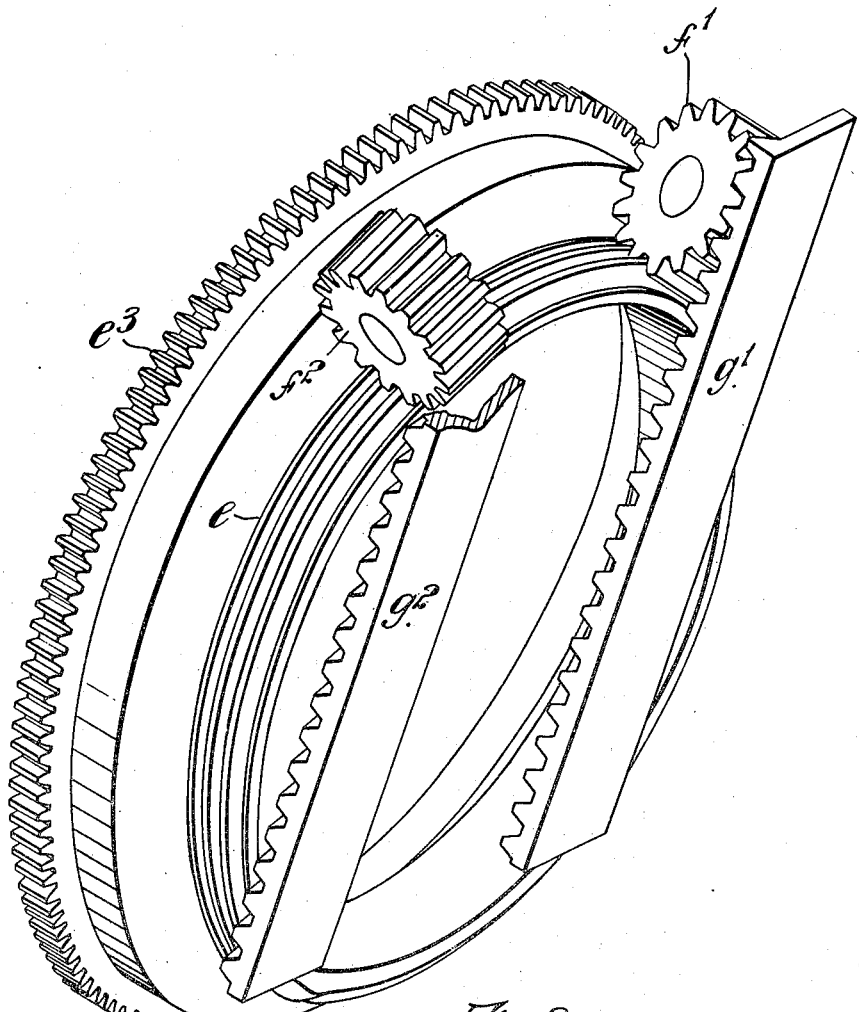
Fig. 3 is an isometric view showing the wormwheels meshing with both the worm and the racks.

Referring to Figs. 1, 2 and 3, $a$ is a face plate mounted coaxially on the main spindle $b$ of a horizontal boring machine and rotated by a pinion (not shown) meshing with spur teeth $a^1$. $c$ is the facing slide, which is displaced across the face plate $a$, and which is slotted at $c^1$ to permit the protrusion of the boring bar $d$.

$e$ is a worm, mounted co-axially about the main spindle $b$, and arranged to be rotated at variable speeds by a shaft $e^1$ through a pinion $e^2$ meshing with a ring of spur wheel teeth $e^3$ on the rear end of the body of the worm $e$. As mentioned above, some parts in Fig. 2 are shown in section in different planes, to facilitate illustration, and it is therefore explained that the axis of the shaft $e^1$ and pinion $e^2$ is not in fact vertically below the axis of the worm $e$ but is off-set so that the pinion $e^2$ meshes with the teeth $e^3$ at a position on the far side of the ring of teeth $e^3$. This drive of the worm follows standard practice and forms no part of the present invention.

The worm $e$ has a helical rib of constant radius and helix angle formed on and surrounding a cylindrical surface as distinguished from a spiral rib of progressively changing radius formed on the face of a disc as shown in our United Kingdom patent specification No. 499,945.

Meshing with the worm $e$ are a pair of wormwheels $f^1$, $f^2$, one on each side of the longitudinal axis $c^2$ of the facing slide $c$. These wormwheels $f^1$, $f^2$ are small in diameter compared with the diameter of the worm $e$, and may therefore be regarded as helical pinions.

The plane of each of the wormwheels $f^1$, $f^2$ is, as usual with worm and wormwheel gearing, radial to the worm $e$.

Each wormwheel $f^1$, $f^2$ meshes with a different rack $g^1$, $g^2$, located one on each side of and parallel with the axis $c^2$ of the facing slide $c$, to which latter both are secured.

The meshing of the wormwheels $f^1$, $f^2$ with both the worm $e$ and the racks $g^1$, $g^2$ is shown pictorially in Fig. 3.

As the wormwheels $f^1$, $f^2$ are radial to the worm $e$ and are on opposite sides of the axis $c^2$ of the slide $c$, they present their teeth oppositely inclined relatively to such axis $c^2$. The teeth of the racks $g^1$, $g^2$, with which the wormwheels $f^1$, $f^2$ mesh as skew pinions, are therefore oppositely inclined.

To produce a balanced thrust on the slide $c$, the pitch of the teeth of both racks $g^1$, $g^2$ must be alike and, to mesh with the wormwheels $f^1$, $f^2$, equally pitched racks must be arranged symmetrically as will now be explained.

Figure 4:
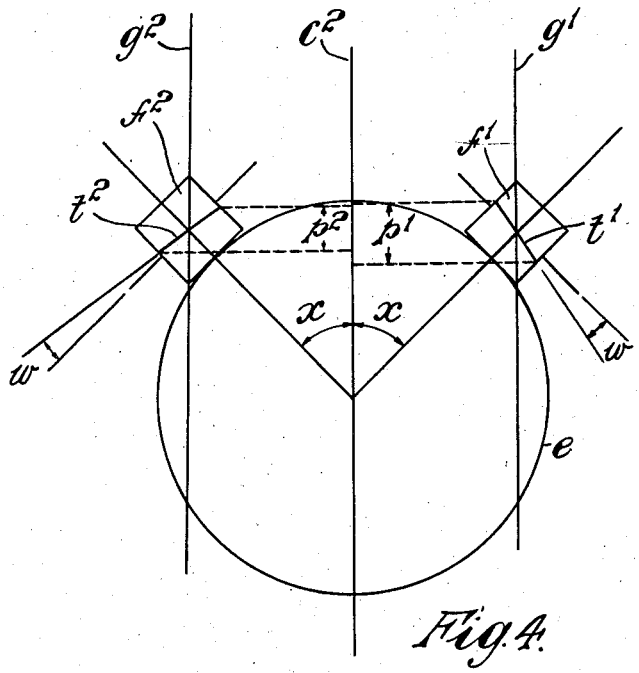
Figs. 4 and 5 are explanatory diagrams.

Fig. 4 shows diagrammatically that if the wormwheels $f^1$ and $f^2$ were arranged symmetrically at an angle $x$ on either side of the facing slide axis $c^2$, the projections $p^1$ and $p^2$ of any two corresponding and identical teeth $t^1$ and $t^2$ on to the common plane of the spindle and facing slide axes, represented by the axis $c^2$, would be different. Consequently such symmetrically arranged wormwheels could not mesh with equally pitched racks $g^1$ and $g^2$ parallel to the axis $c^2$.

Figure 5:
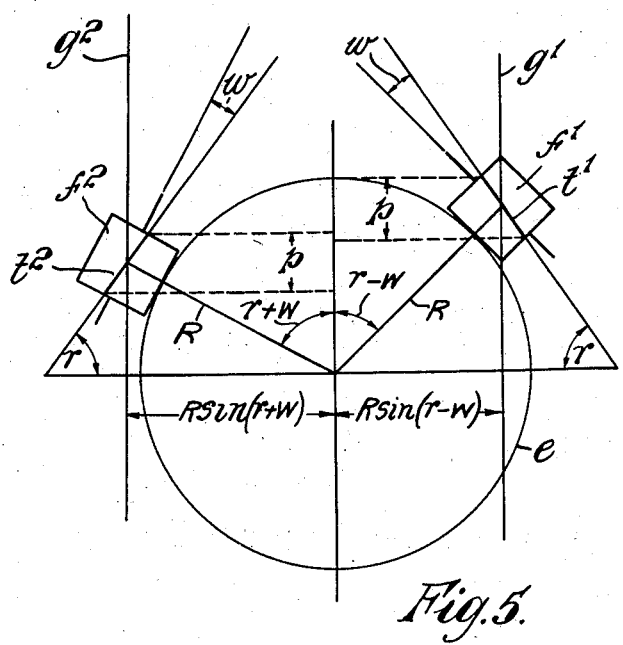

Fig. 5 shows diagrammatically that the projections $p$ on to $c^2$ of the teeth $t^1$ and $t^2$ are equal if the wormwheels have different angular positions and the wormwheels will then mesh with equally pitched racks arranged asymmetrically on either side of the axis $c^2$.

The asymmetrical relationship can be expressed in terms of either the angular positions of the wormwheels or the separation of the racks from the facing slide axis.

If $r$ is the angle of inclination of the rack teeth and $w$ the helix angle of the worm $e$, then the angular positions of the wormwheels $f^1$ and $f^2$ with respect to $c^2$ are respectively $r-w$ and $r+w$.

Alternatively, the mean separation of the racks $g^1$ and $g^2$ from $c^2$ are respectively $R \sin(r-w)$ and $R \sin(r+w)$ where R is the mean radial distance of each wormwheel axis from the axis of the worm $e$.

It will be appreciated that for the purpose of illustration, the helix angle $w$ in Figs. 4 and 5 is larger than would be used in practice. As can be seen from Fig. 2, with a small helix angle as would be used on an actual machine, the angular asymmetry of the wormwheels is not very apparent although it is in fact present and is of course equal to $2w$.

I claim:

In combination with an annular member which is rotatable about its annular axis, a slide member slidably mounted on said annular member with a longitudinal axis of said slide member aligned with the direction of sliding and crossing at right-angles said axis of said annular member, a cylindrical worm member having a helical worm rib of constant radius and helix angle on the cylindrical surface thereof, said cylindrical worm member being rotatably mounted on and coaxially with said annular member, a pair of wormwheels journalled in said annular member and meshing with said helical worm rib at asymmetric positions spaced one on each side of the common plane of said axis of said annular member and said longitudinal axis of said slide member, the angular asymmetry of said positions measured at the axis of said cylindrical worm member being twice the helix angle of said helical worm rib, and a pair of racks having teeth of equal pitch but of oppositely directed inclination on each rack, said racks being mounted fast on said slide member parallel with and spaced one on each side of said longitudinal axis of said slide member to cross said asymmetric positions and mesh one with each of said wormwheels respectively, whereby rotation of said worm member transmits through said wormwheels equal thrust to each of said racks to slide said slide member across said annular member.

References Cited in the file of this patent

UNITED STATES PATENTS

| | | |
|---|---|---|
| 1,947,853 | King | Feb. 20, 1934 |
| 2,254,766 | Andren | Sept. 2, 1941 |
| 2,566,034 | Roberts | Aug. 28, 1951 |

FOREIGN PATENTS

| | | |
|---|---|---|
| 499,945 | Great Britain | Jan. 31, 1939 |
| 632,611 | Great Britain | Nov. 28, 1949 |